(12) United States Patent
Chanda et al.

(10) Patent No.: US 10,817,315 B1
(45) Date of Patent: Oct. 27, 2020

(54) METHOD FOR INTEGRATING APPLICATIONS WITH INFOTAINMENT SYSTEM OF VEHICLE, AND SYSTEM THEREOF

(71) Applicant: Wipro Limited, Bangalore (IN)

(72) Inventors: Debasish Chanda, Maheshtala (IN); Benoy Saha, Halisahar (IN); Aniket Karmakar, Burdwan (IN); Vijayendra Mohan Agrawal, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/795,979

(22) Filed: Feb. 20, 2020

(30) Foreign Application Priority Data

Dec. 31, 2019 (IN) .............................. 201941054739

(51) Int. Cl.
*B60K 35/00* (2006.01)
*G06F 9/451* (2018.01)
*G06F 8/35* (2018.01)

(52) U.S. Cl.
CPC .............. *G06F 9/451* (2018.02); *B60K 35/00* (2013.01); *B60K 2370/152* (2019.05); *B60K 2370/164* (2019.05); *G06F 8/35* (2013.01)

(58) Field of Classification Search
None
See application file for complete search history.

(56) References Cited

U.S. PATENT DOCUMENTS

| | | | | |
|---|---|---|---|---|
| 7,810,105 | B2* | 10/2010 | Prabandham | G06F 9/445 719/328 |
| 2014/0026086 | A1* | 1/2014 | Zuverink | G06F 9/451 715/765 |
| 2015/0193241 | A1* | 7/2015 | Hamzata | G06F 9/45533 719/320 |
| 2017/0336931 | A1* | 11/2017 | Klaucke | G06F 3/0482 |

(Continued)

OTHER PUBLICATIONS

Rieger et al, "A Model-Driven Cross-Platform App Development Process for Heterogeneous Device Classes," Jan. 8, 2019, pp. 7431-7440 (Year: 2019).*

(Continued)

*Primary Examiner* — Alvin H Tan
(74) *Attorney, Agent, or Firm* — Finnegan, Henderson, Farabow, Garrett & Dunner, LLP

(57) ABSTRACT

The present disclosure relates to integrating a plurality of applications with an infotainment system of a vehicle (101). A plurality of integration properties (206) is received from a plurality of applications. Each of the plurality of applications is associated with a projection technology and each of the plurality of application is developed in a respective development language and respective development platform. A plurality of generic behaviour of the plurality of integration properties (206) of the plurality of applications is identified. A projection model is created based on the plurality of generic behaviour of the plurality of integration properties (206) of the plurality of applications. A unified projection application is generated based on the projection model, to integrate the plurality of applications developed (Continued)

using respective development language and development platform with the infotainment system of the vehicle (101).

20 Claims, 10 Drawing Sheets

(56) References Cited

U.S. PATENT DOCUMENTS

2019/0225082 A1\* 7/2019 Mittag .................... H04W 4/40

OTHER PUBLICATIONS

"CarPlay", http://www.allgosystems.com/carplay.php#, AllGo, 2020, 2 pages.

Meixner, G., et al., "autornotiveHMI—Model-Based In-Vehicle Infotainment Description as a Stepping Stone for the Integration of Car and Web", 2012, 3 pages.

\* cited by examiner

| Generic Behavior | CarPlay Properties | Android Auto Properties |
|---|---|---|
| Audio-Video streaming and resource management | CarPlay UI Stream<br>CarPlay Audio Stream | Video, Audio, Automatic Speech Recognition |
| Connection Management | CarPlay Session Management | Connection and launch process |
| Input Event Management | CarPlay Accessory Input Devices Support | Input devices |
| Media Management | CarPlay iAP2 Client – Media Metadata & Control | Application status and data-Media status |
| Telephony Management | CarPlay iAP2 Client – Telephony | Not Applicable. Managed over Head Unit's Bluetooth subsystem |
| Vehicle Status Management | CarPlay iAP2 Client – Vehicle Status & Device notification | Vehicle data |
| Location Management | CarPlay iAP2 Client – Location Information | Navigation Application status and data-Navigation Metadata |
| Projection Protocol Stack | CarPlay Communication Protocol | Receiver Library |
| Projection Transport Component | CarPlay over USB, CarPlay over Wi-Fi | USB connection, Wireless connection |

FIGURE 4

| STATE NAME | | <STATE NAME> | |
|---|---|---|---|
| STATE FUNCTION | | | |
| TYPE | NAME | PARAMETER | |
| ENTRY | <ENTRY FUNC> | <PARAM1>:<VALUE1>; <PARAM2>:<VALUE2> | |
| DO | <DO FUNC> | <PARAM1>:<VALUE1>; <PARAM2>:<VALUE2> | |
| EXIT | <EXIT FUNC> | <PARAM1>:<VALUE1>; <PARAM2>:<VALUE2> | |
| TRANSITION | | | |
| TRIGGER1 | <GUARD11> | <ACTION11> | <NEXT STATE> |
| | <GUARD12> | <ACTION12> | <NEXT STATE> |
| | ... | ... | ... |
| | <GUARD1N> | <ACTION1N> | <NEXT STATE> |
| TRIGGER2 | <GUARD21> | <ACTION21> | <NEXT STATE> |
| | <GUARD22> | <ACTION22> | <NEXT STATE> |
| | ... | ... | ... |
| | <GUARD2N> | <ACTION2N> | <NEXT STATE> |
| ... | ... | ... | ... |
| TRIGGERM | <GUARDM1> | <ACTIONM1> | <NEXT STATE> |
| | <GUARDM2> | <ACTIONM2> | <NEXT STATE> |
| | ... | ... | ... |
| | <GUARDMN> | <ACTIONMN> | <NEXT STATE> |

FIGURE 5b

PLATFORM
SELECTOR

☐ QNX

☐ ANDROID

☐ LINUX

PROJECTION TECHNOLOGY
SELECTOR

☐ APPLE CARPLAY

☐ ANDROID AUTO

☐ BAIDU CARLIFE

[ GENERATE MDPA ]

FIGURE 6b

METHOD FOR INTEGRATING APPLICATIONS WITH INFOTAINMENT SYSTEM OF VEHICLE, AND SYSTEM THEREOF

TECHNICAL FIELD

The present disclosure relates to vehicle infotainment systems. More particularly, the present disclosure relates to a method and a system for integrating applications developed in different platforms and different languages with an infotainment system of a vehicle.

BACKGROUND

With growing demand for luxurious, safe, and smart vehicles, automotive manufacturers are increasingly developing automobiles with infotainment systems that provide a combination of entertainment and information for an enhanced in-vehicle experience. With fast paced innovations, the infotainment systems are challenged to adapt to latest and best solutions in market. Various organizations have defined protocols referred as smartphone projection technologies to connect mobile devices and to share media with the infotainment systems via mobile applications.

Automotive vehicle manufacturers (car Original Equipment Manufacturers (OEMs)) and component manufacturers (tier-1 suppliers to Car OEMs) face numerous challenges to implement various smartphone projection technologies in their systems. OEMs face difficulty in comprehending the smartphone projection technologies and the OEMs spend significant amount of time and effort to integrate the vehicle infotainment system with the mobile devices developed using different smartphone projection technologies.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses a method of integrating a plurality of applications with an infotainment system of a vehicle. The method comprises receiving, by a computing system, a plurality of integration properties from the plurality of applications. Each of the plurality of applications is associated with a projection technology and each of the plurality of application is developed in a respective development language and a respective development platform. Further, the method comprises identifying a plurality of generic behaviour of the plurality of integration properties of the plurality of applications. Furthermore, the method comprises creating a projection model based on the plurality of generic behaviour of the plurality of integration properties of the plurality of applications. Thereafter, the method comprises generating a unified projection application based on the projection model, to integrate the plurality of applications developed using respective development language and the respective development platform with the infotainment system of the vehicle.

In an embodiment, the present disclosure discloses a computing system integrating a plurality of applications with an infotainment system of a vehicle. The computing system comprising a processor and a memory. The processor is configured to receive a plurality of integration properties from a plurality of applications. Each of the plurality of applications is associated with a projection technology and each of the plurality of application is developed in a respective development language and a respective development platform. Further, the processor is configured to identify a plurality of generic behaviour of the plurality of integration properties of the plurality of applications. Furthermore, the processor is configured to create a projection model based on the plurality of generic behaviour of the plurality of integration properties of the plurality of applications. Thereafter, the processor is configured to generate a unified projection application based on the projection model, to integrate the plurality of applications developed using the respective development language and the respective development platform with the infotainment system of the vehicle.

In an embodiment, the present disclosure discloses a non-transitory computer readable medium including instructions stored thereon that when processed by at least one processor cause a computing system to integrate a plurality of applications with an infotainment system of a vehicle. The processor is configured to receive a plurality of integration properties from a plurality of applications. Each of the plurality of applications is associated with a projection technology and each of the plurality of application is developed in a respective development language and a respective development platform. Further, the processor is configured to identify a plurality of generic behaviour of the plurality of integration properties of the plurality of applications. Furthermore, the processor is configured to create a projection model based on the plurality of generic behaviour of the plurality of integration properties of the plurality of applications. Thereafter, the processor is configured to generate a unified projection application based on the projection model, to integrate the plurality of applications developed using the respective development language and the respective development platform with the infotainment system of the vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristics of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

FIG. 4 shows a table showing a plurality of generic behaviour for a plurality of integration properties of the plurality of applications, in accordance with some embodiments of the present disclosure;

FIG. 5b shows internal behaviour modelling of system blocks, in accordance with some embodiments of the present disclosure;

FIG. 6b shows the code generation using User Interface (UI) tool, in accordance with embodiments of the present disclosure;

Figure 1:
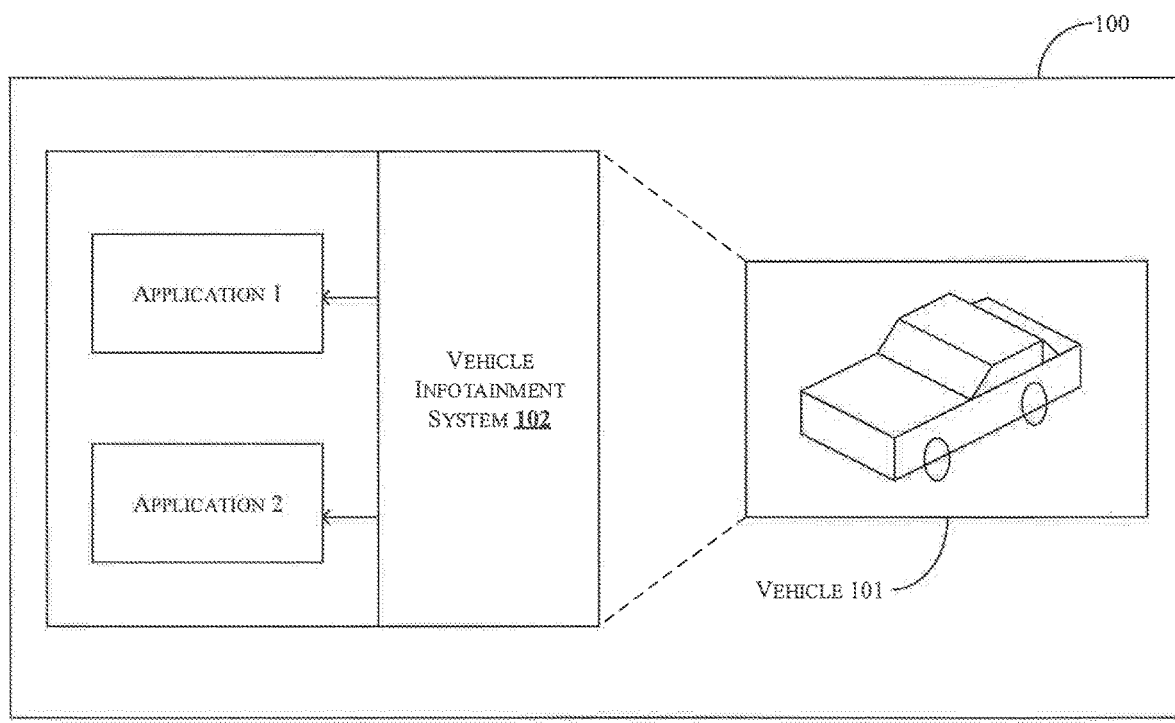
FIG. 1 shows an exemplary environment illustrating integration of a plurality of applications with an infotainment system of a vehicle, in accordance with some embodiments of the present disclosure.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to integrating a plurality of applications with an infotainment system of a vehicle. A plurality of integration properties is received from a plurality of applications. Each of the plurality of applications is associated with a projection technology and each of the plurality of application is developed in a respective development language and a respective development platform. A plurality of generic behaviour of the plurality of integration properties of the plurality of applications is identified. A projection model is created based on the plurality of generic behaviour of the plurality of integration properties of the plurality of applications. A unified projection application is generated based on the projection model, to integrate the plurality of applications developed using the respective development language and the development platform with the infotainment system of the vehicle.

FIG. 1 shows an environment (100). As shown, the environment (100) comprises a vehicle (101). Further, the vehicle (101) may comprise a vehicle infotainment system (102). The vehicle infotainment system (102) provides a combination of entertainment and information for an enhanced vehicle experience. Application 1 and application 2 may be associated with respective projection technology that needs be integrated with the vehicle infotainment system (102). For example, Apple CarPlay® and Android Auto™ may use different projection modes to project the media from respective applications to the vehicle infotainment system (102). In an example, the application 1 may be the Apple® CarPlay® and the application 2 may be the Android Auto™. Any number of applications [application 1, application 2, . . . , application N] may be integrated with the vehicle infotainment system (102) of the vehicle (101) which is referred throughout as a plurality of applications. Further, each of the plurality of applications may be developed using respective languages. For example, the Apple® CarPlay® may be developed using Ruby™ language and the Android Auto™ may be developed using Python™ language.

Figure 2:
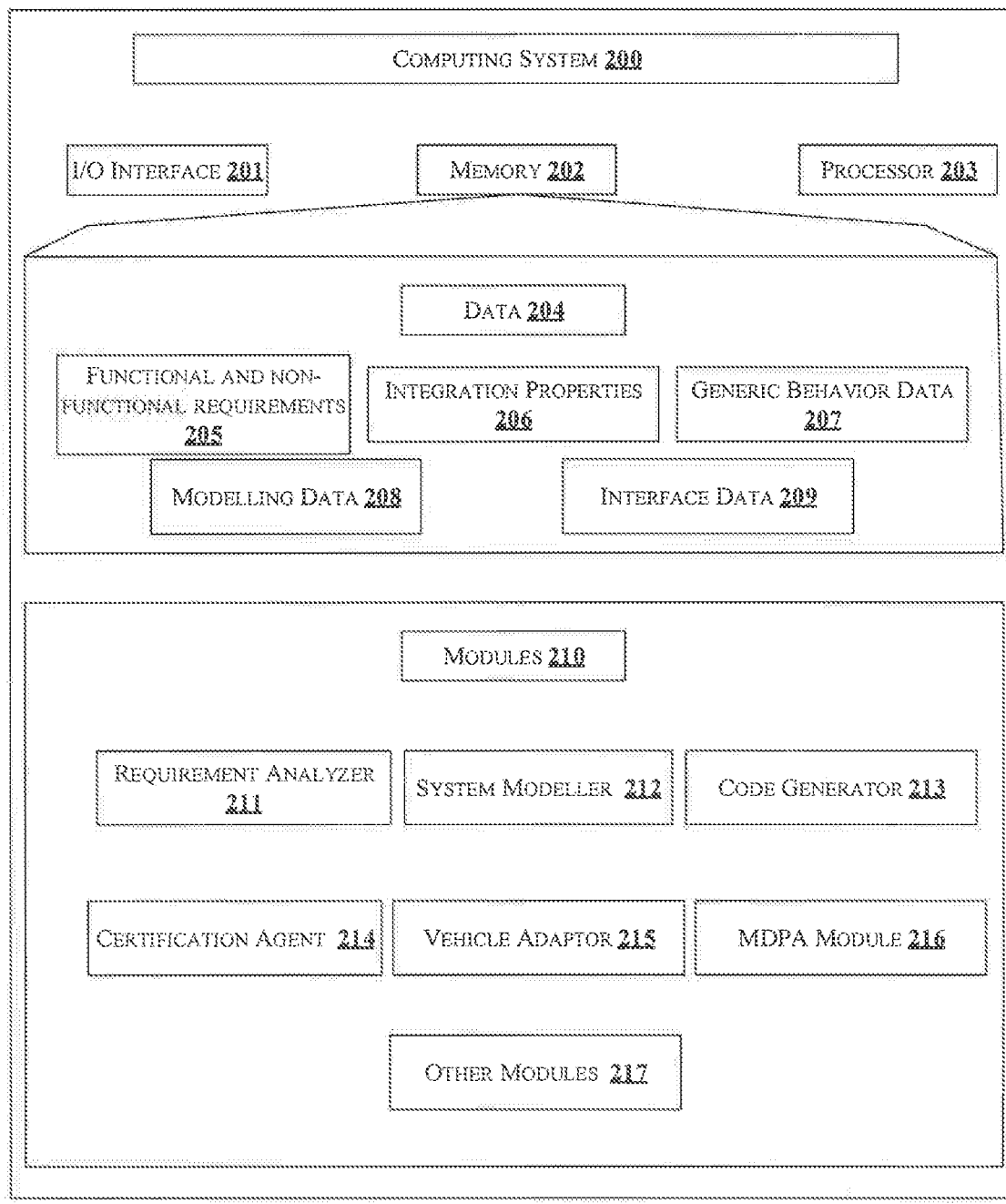
FIG. 2 shows an internal architecture of a computing system to integrate the plurality of applications with the infotainment system of the vehicle, in accordance with some embodiments of the present disclosure.

FIG. 2 illustrates internal architecture of the computing system (200) in accordance with some embodiments of the present disclosure. The computing system (200) may include at least one Central Processing Unit ("CPU" or "processor") (203) and a memory (202) storing instructions executable by the at least one processor (203). The processor (203) may comprise at least one data processor for executing program components for executing user or system-generated requests. The memory (202) is communicatively coupled to the processor (203). The computing system (200) further comprises an Input/Output (I/O) interface (201). The I/O interface (201) is coupled with the processor (203) through which an input signal or/and an output signal is communicated. The computing system (200) may be a personal computer, a laptop, a mobile, a tablet, or any other computing device.

In an embodiment, data (204) may be stored within the memory (202). The data (204) may include, for example, functional and non-functional requirements (205), integration properties (206), generic behaviour data (207), modelling data (208), and interface data (209).

In an embodiment, the functional and non-functional requirements (205) may be the requirements of the vehicle infotainment system (102) for integrating with the plurality of applications. The functional requirement may be calculations, technical details, data manipulation and processing, and other specific functionality that define what the vehicle infotainment system (102) must accomplish. For example, the functional requirements may include, but not limited to media specification of the plurality of applications, media specification of the vehicle infotainment system (102), memory associated with the vehicle infotainment system (102), permissions associated with the media shared between the plurality of applications and the vehicle infotainment system (102) and the like. The non-functional requirement may specify criteria that can be used to judge the operation of the vehicle infotainment system (102), rather than specific behaviour. For example, the non-functional requirements may include, but is not limited to, dimensions of a display associated with the vehicle infotainment system (102), display parameters for projecting content from the plurality of applications on the display, volume control associated with the vehicle infotainment system (102), and the like.

In an embodiment, the plurality of integration properties (206) may be properties associated with the projection technology generated for the at least one of functional and non-functional requirements (205). The integration properties (206) may comprise the properties required to integrate the plurality of applications with the vehicle infotainment system (102). For example, the plurality of integration properties (206) may comprise, but not limited to operating system of the vehicle infotainment system (102) and the plurality of applications, audio/video format supported by the vehicle infotainment system (102) and the plurality of applications, connectivity supported by vehicle infotainment system (102) and the plurality of applications, input/output interface specification of the vehicle infotainment system (102) and the plurality of applications.

In an embodiment, the generic behaviour data (207) is referred as the plurality of generic behaviour (207). The plurality of generic behaviour (207) may comprise common or abstract properties associated with the plurality of applications. For example, the Apple® CarPlay® may have CarPlay session management as a connectivity function and the Android Auto™ may have connection and launch process as the connectivity function. The generic behaviour (207) between the two applications may be a connection management function. The example provided above should not be considered as a limitation, and several other generic properties may be derived or determined based on specific properties associated with the plurality applications.

In an embodiment, the modelling data (208) may be group of requirements of the plurality of generic behaviour (207) of the plurality of integration properties (206). The group of requirements may be the plurality of generic behaviour (207) which may be logically co-related. The modelling data (208) may further comprise a plurality of states and transitions between the plurality of states based on the plurality of generic behaviour (207). A projection model may be created based on the modelling data (208).

In an embodiment, the interface data (209) may be abstracted interfaces which may be implemented on one or more reference vehicle subsystems and one or more target vehicle subsystems. The abstracted interfaces may be referred as one or more interfaces in the present disclosure. The one or more reference vehicle subsystems and the one or more target vehicle subsystems may comprise different vehicle components with which the vehicle infotainment system (102) components may interact. The one or more reference vehicle subsystems and the one or more target vehicle subsystems may comprise an audio subsystem, a video subsystem, an input/output subsystem, a connectivity subsystem, a navigation subsystem, a media subsystem and the like. Examples of platform may include, but not limited to, LINUX™, Android™, UNIX™ and the like.

In an embodiment, the data (204) in the memory (202) may be processed by modules (210) of the system. As used herein, the term modules (210) refers to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality. The modules (210) when configured with the functionality defined in the present disclosure will result in a novel hardware.

In one implementation, the modules (210) may include, for example, a requirement analyzer (211), a system modeller (212), a code generator (213), a certification agent (214), a vehicle adaptor (215), a Model Driven Unified Smartphone Projection Application (MDPA) module (216) and other modules (217). It will be appreciated that such aforementioned modules (210) may be represented as a single module or a combination of different modules.

In an embodiment, the requirement analyzer (211) may capture functional and non-functional requirements (205) from a protocol specification available in an inventory. The inventory may hold communication stack, the protocol specification, end product certification guideline, certification test items, and certification test tool associated with the projection technology. For example, Apple provides reference code as communication stack for communication plug-in (i.e., responsible for communication between mobile device and infotainment device), Apple® provides MFi portal which defines CarPlay protocol specification that each OEM need to ensure, Apple® provides MFi portal for product certification guidelines which must be executed and Apple® provides ATS (Apple Test Suite) which should be used for CarPlay certification. The requirement analyzer (211) may perform requirement organization to classify the plurality of integration properties (206) of the plurality of applications into the plurality of generic behaviour (207) and a plurality of specific behaviour. In an embodiment, the requirement analyzer (211) may organize the functional and non-functional requirements (205) into appropriate hierarchies. The hierarchies may represent the classification of the functional and non-functional requirements in different levels.

In an embodiment, the system modeller (212) may define a structure for the vehicle infotainment system (102) using a plurality of blocks based on requirement organization performed by the requirement analyzer (211). In an embodiment, each of the plurality of blocks may represent a functionality for integrating the plurality of applications with the vehicle infotainment system (102). For example, a block may represent an audio interface for projecting audio data from an application to a music system of a vehicle. In an embodiment, the plurality of blocks may be mapped to a group of the plurality of generic behaviour (207). In an embodiment, one or more modelled interface may be defined for each of the plurality of blocks. For example, ports may be defined to describe the one or more modelled interface. The ports may be High Speed Data (HSD) ports, High-Definition Multimedia Interface (HDMI) ports and the like. Based on the one or more interfaces used by the plurality of blocks, one or more connectors may be defined. For example, the connectors may be high-frequency coaxial connectors, HSD connectors, HDMI connectors and the like. In an embodiment, the system modeller (212) may define an internal behaviour for each of the system block. The internal behaviour of a system block may comprise a logic to perform in a current state, and a logic to perform one or more transitions between one or more states, and a logic to interact with the one or more system blocks. The system modeller (212) may create the projection model based on the internal behaviour of the plurality of blocks.

In an embodiment, the code generator (213) may generate the code from the projection model created by the system modeller (212). The code generator (213) may use language binder and platform binder to generate a MDPA code in the development language and the development platform. The language binder may bind the code such that the code written for one language can be used in another language with respect to the platform. The generated unified projection application may provide the one or more interfaces to implement on the one or more reference vehicle subsystems and the one or more target vehicle subsystems. In the specification, the terms code and MDPA code are used interchangeably.

In an embodiment, the certification agent (214) may perform certification validation of the one or more interfaces implemented by the vehicle adaptor (215). The certification agent (214) may comprise a certification test suite generator to generate certification test suites and may update the test suites based on a change notification received from the inventory. The certification agent (214) may further comprise a certification manager which may receive a certification request notification from the vehicle adaptor (215) and schedules certification test execution based on a priority. Also, the certification agent (214) may comprise a certification test executor which may execute an automated certification test, update the certification manager and may upload result to a remote server.

In an embodiment, the vehicle adaptor (215) may receive the MDPA code generated for the development language and the development platform from the MDPA module (216). The vehicle adaptor (215) may implement the one or more interfaces on the one or more reference vehicle subsystems and upon successful validation, the vehicle adaptor (215) may implement the one or more interfaces on the one or more target vehicle subsystems. The vehicle adaptor (215) may implement the one or more interfaces which may be specific to the target vehicle on the one or more target vehicle subsystems.

In an embodiment, the MDPA module (216) may hold the MDPA code for different development platform and development language generated by the code generator (213). The MDPA module (216) may provide the MDPA code for a specific development platform on request from the vehicle adaptor (215).

Figure 6A:
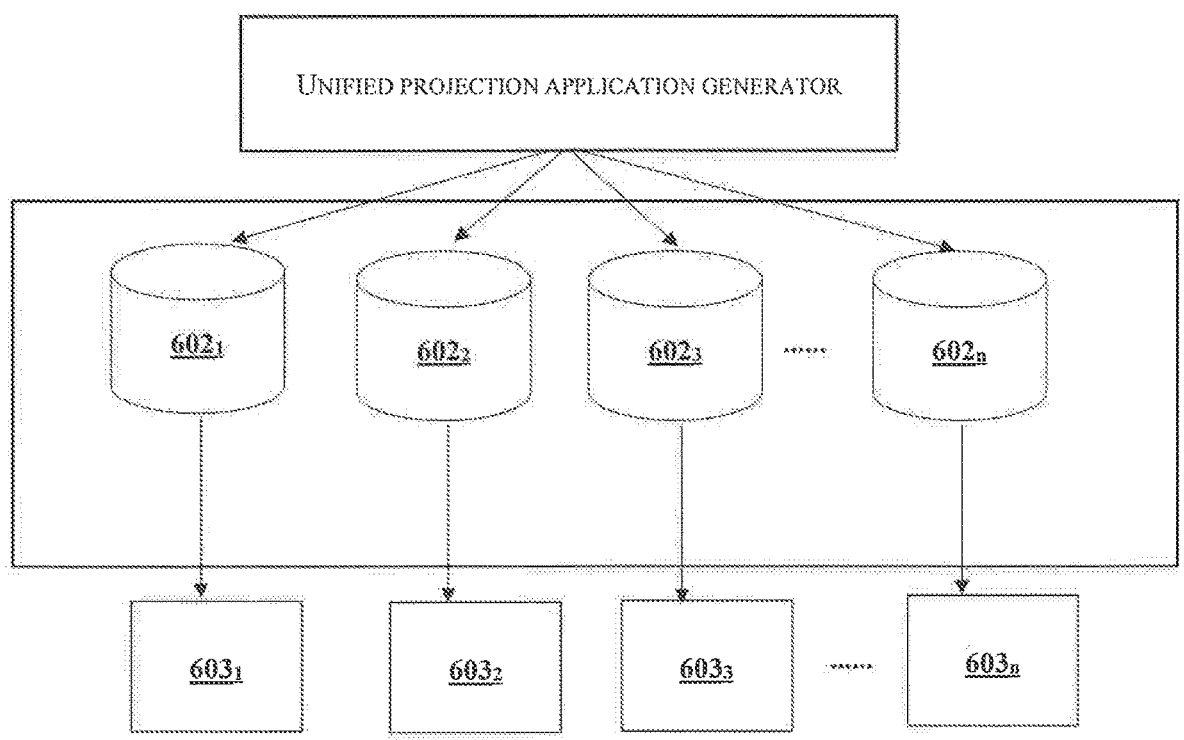
FIG. 6a shows a diagram illustrating generated unified projection application for respective development language and development platform, in accordance with embodiments of the present disclosure.
Figure 6C:
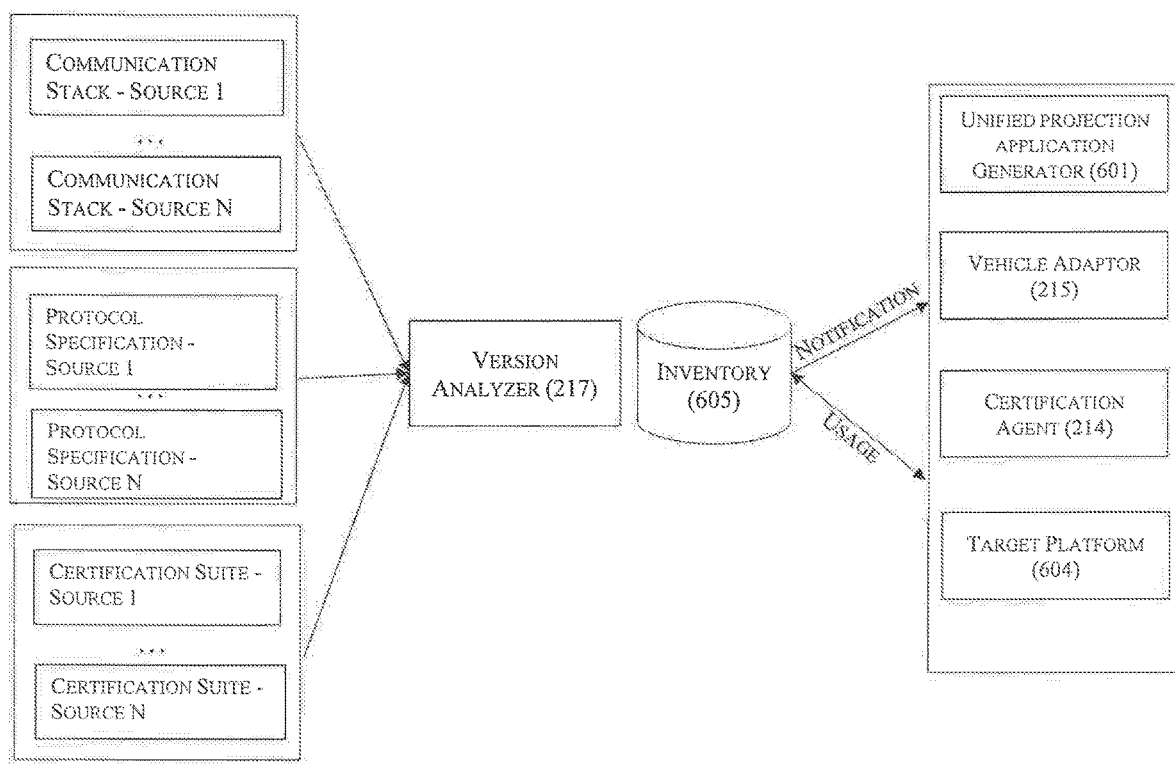
FIG. 6c shows the working of version analyzer, in accordance with embodiments of the present disclosure.

In an embodiment, the other modules (217) may comprise a version analyzer. As shown in FIG. 6c, the version analyzer may monitor continuously for release of any new version of protocol specification, communication stack and certification suite provided by the projection technology provider. The version analyzer may download and store a latest version into the version analyzer's local database. The version analyzer may notify the computing system (200) regarding the change in version. For example, the certification agent may be notified about a change in the certification suite version. Similarly, MDPA module (216) may be notified about a change in communication Stack and protocol specification. The computing system (200) may download the latest version on receiving the notification.

Figure 3:
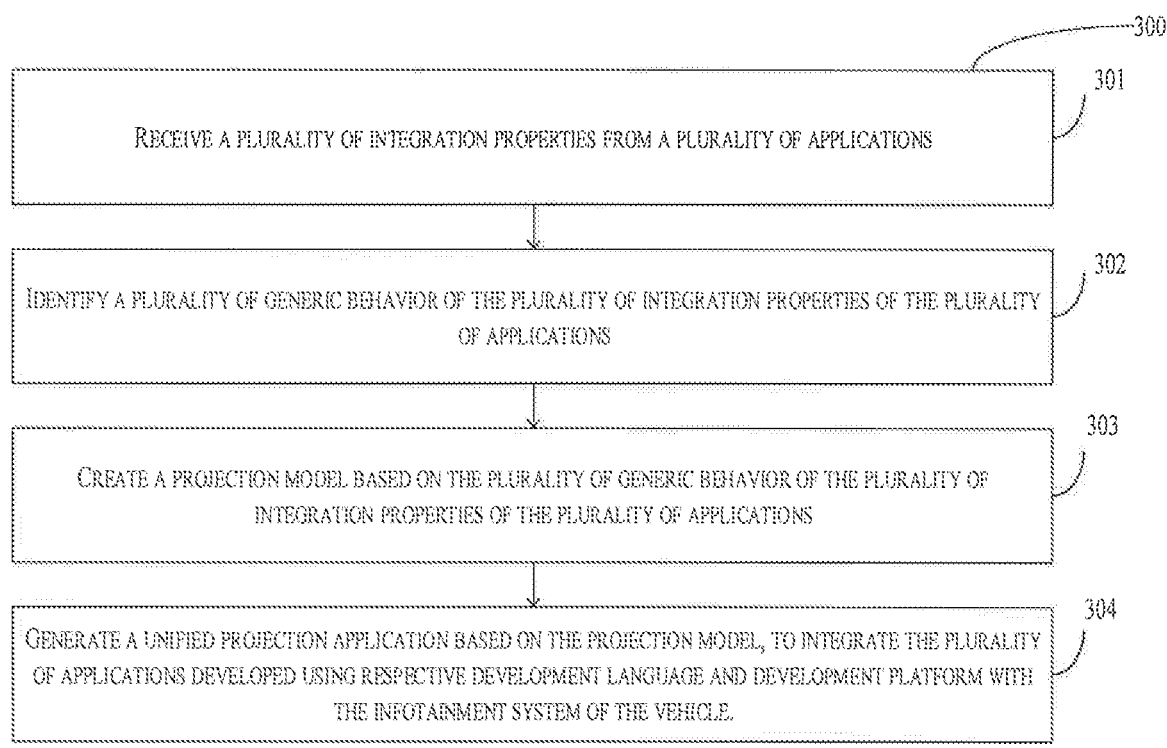
FIG. 3 shows an exemplary flow chart illustrating method steps to integrate the plurality of applications with the infotainment system of the vehicle, in accordance with some embodiments of the present disclosure.

FIG. 3 shows a flow chart illustrating a method to integrate the plurality of applications with the infotainment system of the vehicle, in accordance with some embodiments of the present disclosure. As illustrated in FIG. 3, the method (300) may comprise one or more steps. The method (300) may be described in the general context of computer executable instructions. Generally, computer executable instructions can include routines, programs, objects, components, data structures, procedures, modules, and functions, which perform particular functions or implement particular abstract data types.

The order in which the method (300) is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At step (301), receiving, by the computing system (200), the plurality of integration properties (206) from the plurality of applications. Each of the plurality of applications may be associated with a projection technology and each of the plurality of application may be developed in respective development language and respective development platform. For example, the projection technology may be Apple® CarPlay®, Android Auto™ or the like and the application may be an application of the Apple CarPlay®, the Android Auto™ or the like. The development language may be Python® and the development platform may be LINUX®. The plurality of integration properties (206) may comprise the properties required to integrate the plurality of applications with the vehicle infotainment system (102). For example in FIG. 4, the plurality of integration properties (206) may comprise audio/video, media, navigation properties from the plurality of applications associated with the projection technology. The second and third column in the table shown in FIG. 4 indicate the plurality of integration properties (206) received from the plurality of applications. The requirement analyzer (211) may capture at least one of the functional and non-functional requirements (205) from a protocol specification available in an inventory. The inventory may hold communication stack, the protocol specification, end product certification guideline, certification test items and certification test tool associated with the projection technology.

Referring back to FIG. 3, at step (302), identifying, by the computing system (200), the plurality of generic behaviour (207) of the plurality of integration properties (206) of the plurality of applications. The requirement analyzer (211) may classify the plurality of integration properties (206) into the plurality of generic behaviour (207) and the plurality of specific behaviour across the plurality of applications associated with the projection technology. Further, the requirement analyzer (211) may organize the functional and non-functional requirements (205) into appropriate hierarchies. The plurality of generic behaviour (207) may refer to abstract properties across different projection technologies. Referring again to the example of FIG. 4, two projection technologies considered are Apple® CarPlay®, Android Auto™. The vehicle subsystem may be the audio subsystem, the video subsystem, a navigation subsystem and the like. The abstract properties of Apple CarPlay®, Android Auto™ may be identified as the plurality of generic behaviour (207). As shown in FIG. 4, a property of the Apple® CarPlay® may be Car Play UI stream, and a property of the Android Auto™ may be video, audio, and automatic speech recognition. The requirement analyzer (211) may extract abstract properties for the two properties of the applications and determine a generic behaviour of the properties. Therefore, the generic behaviour may be common to both the applications (Apple® CarPlay®, Android Auto™).

Figure 5A:
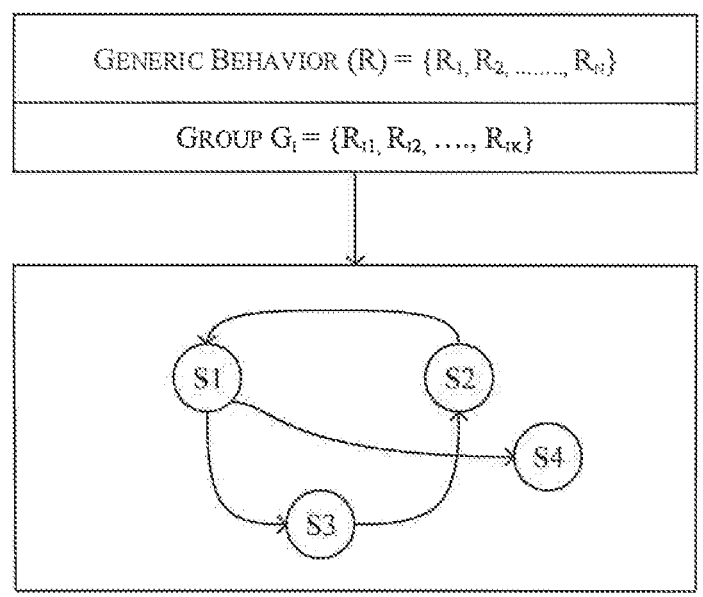
FIG. 5a shows an exemplary diagram illustrating creation of a projection model based on generic behaviour of the plurality of integration properties of the plurality of applications, in accordance with some embodiments of the present disclosure.

Referring back to FIG. 3, at step (303), creating, by the computing system (200), the projection model based on the plurality of generic behaviour (207) of the plurality of integration properties (206) of the plurality of applications. The system modeller (212) may receive the plurality of generic behaviour (207) from the requirement analyzer (211). The system modeller (212) may define a system structure using the plurality of blocks based on requirement organization done by the requirement analyzer (211). The system blocks may be mapped to a group of the plurality of generic behaviour (207). For example, each block may represent a subsystem of the vehicle infotainment system (102). A first block may represent the audio subsystem, a second block may represent the video subsystem. Each block may be configured with one or more functional and non-functional operations. In an embodiment, each block may be configured with one or more interfaces. For example, one or more ports may be defined to describe one or more modelled interface provided for each block. The one or more modelled interfaces may be used to communicate with other blocks. Based on the one or more interfaces used by the plurality of blocks, one or more connectors may be defined. The system modeller (212) may define an internal behaviour for each block. Modelling of the internal behaviour may comprise state modelling and use case modelling. The state modelling may refer to implementing of state behaviour. In an embodiment, each block may be configured with a plurality of states (e.g., previous state, current state, next state). Each state may have an: "entry function", a "do function" and an "exit function". "The entry function" may be executed when there is a transition from other state (e.g., previous state) to a current state. The "do function" may be executed for continuously processing a functional or non-functional logic in the current state. The "exit function" may be executed when there is a transition to other state (e.g., next state) from the current state. The use case modelling may refer to implementing a sequence of states. The use case modelling may include implementing each state and transitions between the plurality of states. A transition function may comprise a guard function, an action function and a next state. For each trigger, the guard function may be evaluated before taking action. The guard function may contain an expression that must be true for the transition to occur. After evaluation, the action function may be executed. Next state may comprise name of the next state. As shown in FIG. 5b, the guard function may be evaluated. If the guard function evaluates to true, the transition may be triggered, and if the guard evaluates to false, then the action may not be executed. The projection model may be created based on the modelling of the internal behaviour of the plurality of blocks.

As shown in FIG. 5, the functional and non-functional requirements (205) may be (R)=$\{R_1, R_2, \ldots, R_n\}$. The abstract properties logically co-related may be divided into multiple groups. Set G may represent the set of all groups. G=$\{G_1, G_2, \ldots, G_m\}$ where $G_i$ may represent $i^{th}$ group. $G_i$ may be defined as follows: $G_i=\{R_{i1}, R_{i2}, \ldots, R_{ip}\}$ where $R_{ik}$ may represents $k^{th}$ requirements for $i^{th}$ group and $R_{ik} \in R$. The system modeller (212) may comprise a state machine to implement the plurality of generic behaviour (207) through state and behaviour modelling. The state machine may define the current state and the transition between the states. In FIG. 5, $S_1$, $S_2$, $S_3$ and $S_4$ may represent various states. Further, the state machine may create the projection model based on the state and behaviour modelling. As shown in FIG. 6b, after successful modelling, the code generation may be done using an UI tool. The UI tool may give an option to a user to select the platform and projection technology for which the MDPA source code may be generated. It may allow the system to generate MDPA for multiple platform simultaneously.

Referring back to FIG. 3, at step (304), generating, by the computing system (200), a unified projection application based on the projection model, to integrate the plurality of applications developed using respective development language and development platform with the infotainment system of the vehicle. The code generator (213) may generate code from the projection model created by the system modeller (212). The code generator (213) may use language binder and platform binder to generate the MDPA code in the development language and the development platform. For example, the development language may be Java® and the development platform may be Android®. The generated unified projection application may provide the one or more interfaces. For example, the interfaces may be requestAudioFocus ( ), releaseAudioFocus ( ). Audio focus may handle playing of audio source from different applications. The MDPA module (216) may hold the MDPA codes for different development platform and development language generated by the code generator (213). The MDPA module (216) may provide the MDPA code for a specific development platform on request from the vehicle adaptor (215). The vehicle adaptor (215) may implement the one or more interfaces on the one or more reference vehicle subsystems. Reference vehicle subsystems may refer to an application component with test cases on which the abstracted interfaces may be implemented. The vehicle adaptor (215) may comprise vehicle subsystem implementor and vehicle adaptor builder. The vehicle subsystem implementor may implement the one or more interfaces on the one or more reference vehicle subsystems. As shown in FIG. 6a, the respective vehicle adaptor $[603_1, 603_2, \ldots, 603_n]$ builder may receive the MDPA code corresponding to MDPA platform $[602_1, 602_2, \ldots, 602_n]$. The MDPA module (216) may interact with the certification agent (214) after the implementation of one or more interfaces by the vehicle subsystem implementor. The certification agent (214) may perform certification validation of the one or more interfaces which may be implemented on the one or more reference vehicle subsystems. Upon successful validation, the code may be stored into reference vehicle adapter repository and the one or more interfaces may be implemented on the one or more target vehicle subsystems. The certification agent (214) may perform certification validation of the one or more interfaces which may be implemented on the one or more target vehicle subsystems. Upon successful validation, the unified projection application may be deployed on a target vehicle. The vehicle adaptor (215) may implement the one or more interfaces which may be specific to the target vehicle on the one or more target vehicle subsystems.

In an embodiment, a unified projection application is developed which is independent of development language and development platform. Further, integration challenges are addressed, and the Automotive vehicle manufacturers can easily deploy the unified projection application in their product generated.

In one illustration, the method and system disclosed in the present disclosure is implemented at the manufacturing and/or integrating stage of vehicle subsystems. For example, an application-1 developed using a specific development language and a development platform, may be integrated with an infotainment system of a vehicle (101). The OEM may use the unified projection application to integrate the application-1 with the infotainment system. The unified projection application may receive the specification of the application-1 as input and generate a code specific to the requirements of the application-1. Further, an application-2 developed using a specific development language and development platform, which is different from that of the application-i, may be integrated with the infotainment system of the vehicle (101). The unified projection application receives the specification of the application-2 and generates a code specific to the requirements of the application-2. Further, the application-2 is integrated with the infotainment system. Thus, the unified projection application may receive specification from different applications developed in different languages and platforms and may integrate the different applications with the infotainment system of the vehicle (101). Also, any update in the application, which is already integrated, is given as input to the system. The system generates the code based on the updates in the application. Thus, the infotainment system is updated. Therefore, the unified projection application is development language independent and development platform independent. Also, the OEMs may not develop integration codes for different applications.

Computer System

Figure 7:
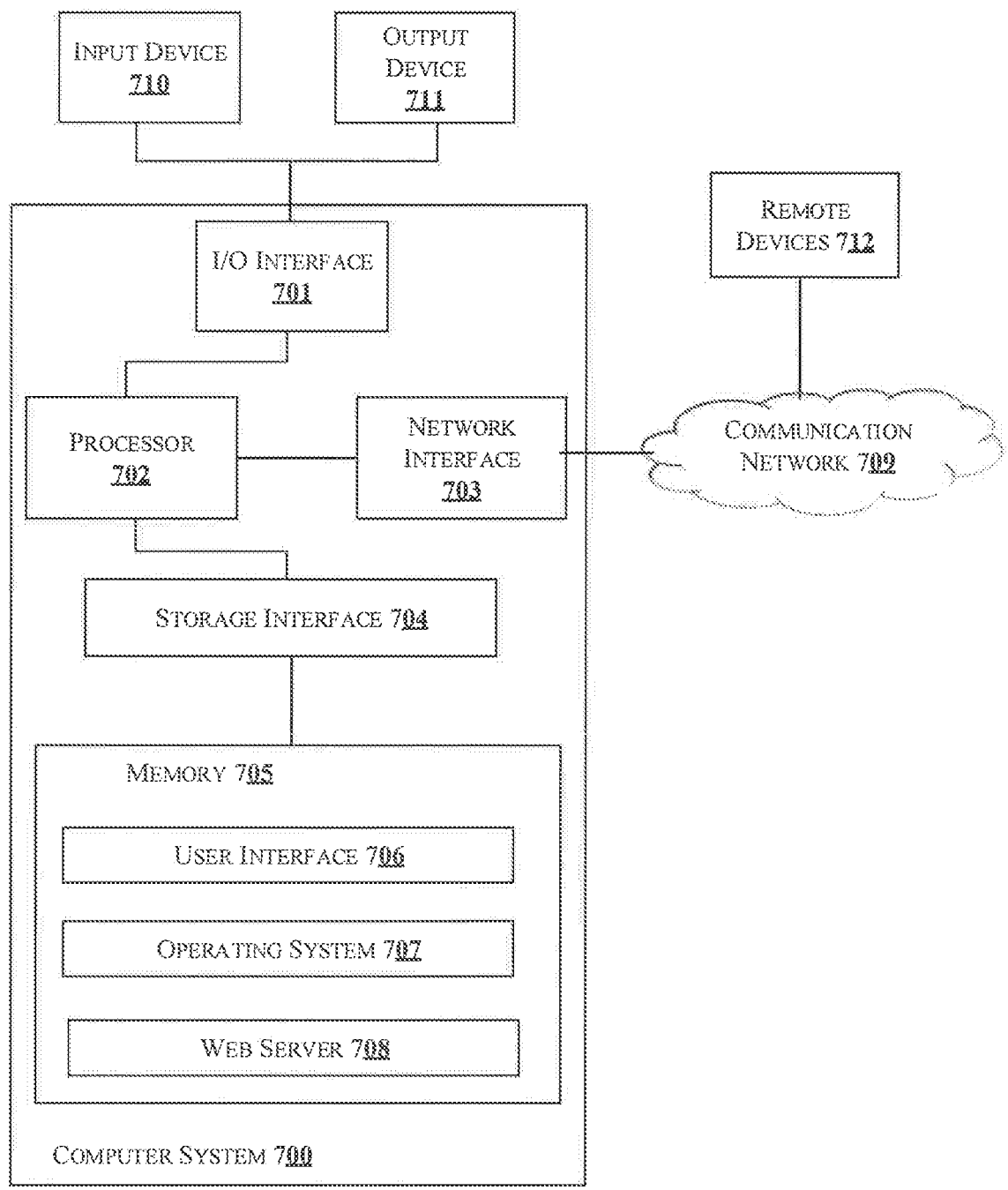
FIG. 7 shows a block diagram of a general-purpose computing system to integrate the plurality of applications with the infotainment system of the vehicle, in accordance with embodiments of the present disclosure.

FIG. 7 illustrates a block diagram of an exemplary computer system (700) for implementing embodiments consistent with the present disclosure. In an embodiment, the computer system (700) is used to implement generation of sentiment-based summary for user reviews. The computer system (700) may comprise a central processing unit ("CPU" or "processor") (702). The processor (702) may comprise at least one data processor. The processor (702) may include specialized processing units such as integrated system (bus) controllers, memory management control units, floating point units, graphics processing units, digital signal processing units, etc.

The processor (702) may be disposed in communication with one or more input/output (I/O) devices (not shown) via I/O interface (701). The I/O interface (701) may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface (701), the computer system (700) may communicate with one or more I/O devices. For example, the input device (710) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (711) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system (700) is connected to the remote devices (712) through a communication network (709). The remote devices (712) may provide the user reviews to the computing network 700. The processor (702) may be disposed in communication with the communication network (709) via a network interface (703). The network interface (703) may communicate with the communication network (709). The network interface (703) may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network (709) may include, without limitation, a direct interconnection, local area network (LAN), wide area network (WAN), wireless network (e.g., using Wireless Application Protocol), the Internet, etc. Using the network interface (703) and the communication network (709), the computer system (700) may communicate with the scene remote devices (712). The network interface (703) may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network (709) includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor (702) may be disposed in communication with a memory (705) (e.g., RAM, ROM, etc. not shown in FIG. 7) via a storage interface (704). The storage interface (704) may connect to memory (705) including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (705) may store a collection of program or database components, including, without limitation, user interface (706), an operating system (707), web server (708) etc. In some embodiments, computer system (700) may store user/application data, such as, the data, variables, records, etc., as described in this disclosure. Such databases may be implemented as fault-tolerant, relational, scalable, secure databases such as Oracle® or Sybase®.

The operating system (707) may facilitate resource management and operation of the computer system (800). Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system (700) may implement a web browser (708) stored program component. The web browser (708) may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers (708) may utilize facilities such as AJAX™, DHTML™, ADOBE® FLASH™, JAVASCRIPT™, JAVA™, Application Programming Interfaces (APIs), etc. In some embodiments, the computer system (700) may implement a mail server (not shown in Figure) stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system (800) may implement a mail client stored program component. The mail client (not shown in Figure) may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 3 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of integrating a plurality of applications with an infotainment system of a vehicle (101), the method comprising:
    receiving, by a computing system (200), a plurality of integration properties from a plurality of applications, wherein each of the plurality of applications is associated with a projection technology, and wherein each of the plurality of applications is developed in a respective development language and a respective development platform;
    identifying, by the computing system (200), a plurality of generic behaviour of the plurality of integration properties (206) of the plurality of applications;
    creating, by the computing system (200), a projection model based on the plurality of generic behaviour of the plurality of integration properties (206) of the plurality of applications; and
    generating, by the computing system (200), a unified projection application based on the projection model, to integrate the plurality of applications developed using the respective development language and the respective development platform with the infotainment system of the vehicle (101).

2. The method of claim 1, wherein identifying the plurality of generic behaviour comprises:
    identifying at least one of functional and non-functional requirements (205) of the plurality of applications;
    generating the plurality of integration properties (206) for the at least one of functional and non-functional requirements (205); and
    classifying the generated plurality of integration properties (206) into the plurality of generic behaviour and a plurality of specific behaviour.

3. The method of claim 1, wherein creating the projection model comprises:

generating a plurality of blocks based on the plurality of generic behaviour of the plurality of integration properties (206);

defining transition between the plurality of blocks; and creating the projection model based on the plurality of blocks and the transition between the plurality of blocks.

4. The method of claim 1, wherein generating the unified projection application comprises defining one or more interfaces for integrating with one or more vehicle infotainment subsystems.

5. The method of claim 4, wherein the one or more interfaces are implemented by:

implementing the one or more interfaces on one or more reference vehicle subsystems;

validating the one or more interfaces implemented on the one or more reference vehicle subsystems;

upon successful validation, implementing the one or more interfaces on one or more target vehicle subsystems;

validating the one or more interfaces implemented on the one or more target vehicle subsystems; and deploying the unified projection application on a target vehicle.

6. The method of claim 1, wherein the generated unified projection application for the plurality of applications is stored in a repository, which is provided to a vehicle adaptor (215) upon receiving a request from the vehicle adaptor (215).

7. The method of claim 1, wherein one or more versions of the generated unified projection application are updated based on an update in the corresponding application and projection technology.

8. A computing system (200), for integrating a plurality of applications with an infotainment system of a vehicle (101), the system comprising:

a processor (203); and a memory (202), wherein the memory (202) stores processor-executable instructions, which, on execution, cause the processor (203) to:

receive a plurality of integration properties (206) from a plurality of applications, wherein each of the plurality of applications is associated with a projection technology, and wherein each of the plurality of applications is developed in a respective development language and a respective development platform;

identify a plurality of generic behaviour of the plurality of integration properties (206) of the plurality of applications;

create a projection model based on the plurality of generic behaviour of the plurality of integration properties (206) of the plurality of applications; and generate a unified projection application based on the projection model, to integrate the plurality of applications developed using the respective development language and the respective development platform with the infotainment system of the vehicle (101).

9. The system of claim 8, wherein the processor (203) identifies the plurality of generic behaviour by:

identifying at least one of functional and non-functional requirements (205) of the plurality of applications;

generating the plurality of integration properties (206) for the at least one of functional and non-functional requirements; and classifying the generated plurality of integration properties (206) into the plurality of generic behaviour and a plurality of specific behaviour.

10. The system of claim 8, wherein the processor (203) creates the projection model by:

generating a plurality of blocks based on the plurality of generic behaviour of the plurality of integration properties (206);

defining transition between the plurality of blocks; and creating the projection model based on the plurality of blocks and the transition between the plurality of blocks.

11. The system of claim 8, wherein the processor (203) generates the unified projection application by defining one or more interfaces for integrating with one or more vehicle infotainment subsystems.

12. The system of claim 11, wherein the processor (203) implements the one or more interfaces by:

implementing the one or more interfaces on one or more reference vehicle subsystems;

validating the one or more interfaces implemented on the one or more reference vehicle subsystems;

upon successful validation, implementing the one or more interfaces on one or more target vehicle subsystems;

validating the one or more interfaces implemented on the one or more target vehicle subsystems; and deploying the unified projection application on a target vehicle.

13. The system of claim 8, wherein the generated unified projection application for the plurality of applications is stored in a repository, which is provided by the processor to a vehicle adaptor (215) upon receiving a request from the vehicle adaptor (215).

14. The system of claim 8, wherein the processor (203) updates one or more versions of the generated unified projection application based on an update in the corresponding application and projection technology.

15. A non-transitory computer readable medium including instructions stored thereon that when processed by at least one processor cause a computing system (200) to, receive a plurality of integration properties (206) from a plurality of applications, wherein each of the plurality of applications is associated with a projection technology, and wherein each of the plurality of applications is developed in a respective development language and a respective development platform;

identify a plurality of generic behaviour of the plurality of integration properties (206) of the plurality of applications;

create a projection model based on the plurality of generic behaviour of the plurality of integration properties (206) of the plurality of applications; and generate a unified projection application based on the projection model, to integrate the plurality of applications developed using the respective development language and the respective development platform with the infotainment system of the vehicle (101).

16. The medium of claim 15, wherein the processor (203) identifies the plurality of generic behaviour by:

identifying at least one of functional and non-functional requirements (205) of the plurality of applications;

generating the plurality of integration properties (206) for the at least one of functional and non-functional requirements; and classifying the generated plurality of integration properties (206) into the plurality of generic behaviour and a plurality of specific behaviour.

17. The medium of claim 15, wherein the processor (203) creates the projection model by:

generating a plurality of blocks based on the plurality of generic behaviour of the plurality of integration properties (206);

defining transition between the plurality of blocks; and creating the projection model based on the plurality of blocks and the transition between the plurality of blocks.

18. The medium of claim 15, wherein the processor (203) generates the unified projection application by defining one or more interfaces for integrating with one or more vehicle infotainment subsystems.

19. The medium of claim 15, wherein the processor (203) implements the one or more interfaces by:

implementing the one or more interfaces on one or more reference vehicle subsystems;

validating the one or more interfaces implemented on the one or more reference vehicle subsystems;

upon successful validation, implementing the one or more interfaces on one or more target vehicle subsystems;

validating the one or more interfaces implemented on the one or more target vehicle subsystems; and deploying the unified projection application on a target vehicle.

20. The medium of claim 15, wherein the generated unified projection application for the plurality of applications is stored in a repository, which is provided by the processor to a vehicle adaptor (215) upon receiving a request from the vehicle adaptor (215), wherein the processor (203) updates one or more versions of the stored unified projection application based on an update in the corresponding application and projection technology.

\* \* \* \* \*